(12) United States Patent
Hankins et al.

(10) Patent No.: US 12,267,091 B2
(45) Date of Patent: Apr. 1, 2025

(54) BASEBALL PITCH SELECTION COMMUNICATION SYSTEM

(71) Applicants: John Andrew Hankins, Carlsbad, CA (US); Craig Anothony Fillcetti, Scottsdale, AZ (US)

(72) Inventors: John Andrew Hankins, Carlsbad, CA (US); Craig Anthony Filicetti, Scottsdale, AZ (US)

( * ) Notice: Subject to any disclaimer, the term of this patent is extended or adjusted under 35 U.S.C. 154(b) by 502 days.

(21) Appl. No.: 17/781,352

(22) PCT Filed: Nov. 17, 2020

(86) PCT No.: PCT/US2020/060893
§ 371 (c)(1),
(2) Date: May 31, 2022

(87) PCT Pub. No.: WO2021/113073
PCT Pub. Date: Jun. 10, 2021

(65) Prior Publication Data
US 2022/0416821 A1    Dec. 29, 2022

Related U.S. Application Data

(60) Provisional application No. 62/974,517, filed on Dec. 3, 2019.

(51) Int. Cl.
*H04B 1/034* (2006.01)
*A42B 1/245* (2021.01)
(Continued)

(52) U.S. Cl.
CPC ............ *H04B 1/0343* (2013.01); *A42B 1/245* (2013.01); *A63B 71/0622* (2013.01);
(Continued)

(58) Field of Classification Search
CPC ...... H04B 1/0343; H04B 1/086; H04B 1/707; H04B 1/713; A42B 1/245; A63B 71/0622;
(Continued)

(56) References Cited

U.S. PATENT DOCUMENTS 4,203,595 A   5/1980   Thompson
4,536,739 A   8/1985   Nobuta
(Continued)

FOREIGN PATENT DOCUMENTS

JP   6030223 A       2/1985
JP   2003198457 A  * 7/2003
(Continued)

OTHER PUBLICATIONS

International Search Report and Written Opinion issued Feb. 16, 2021 in corresponding PCT/US2020/060893.
(Continued)

*Primary Examiner* — Raymond S Dean
(74) *Attorney, Agent, or Firm* — NovoTechIP International PLLC

(57) ABSTRACT

A system for communicating pitch selections wirelessly from a wireless transmitter has a coded signal generator that generates coded signals in accordance with selected pitch types. A receiver decodes the received coded signals, selects an audio file based on the received coded signal and generates an audio signal announcing the selected pitch type based on the transmitted selected pitch type in accordance with the received coded signal. The audio signal is transduced by a bone conductor transducer so that the player can hear the announced selected pitch type through bone conduction.

15 Claims, 6 Drawing Sheets

(51) Int. Cl.

| | |
|---|---|
| A63B 71/06 | (2006.01) |
| G06F 3/16 | (2006.01) |
| H04B 1/08 | (2006.01) |
| H04B 1/707 | (2011.01) |
| H04B 1/713 | (2011.01) |
| H04R 1/10 | (2006.01) |
| H04R 3/12 | (2006.01) |
| A63B 102/18 | (2015.01) |

(52) U.S. Cl.
CPC ............. *G06F 3/165* (2013.01); *H04B 1/086* (2013.01); *H04B 1/707* (2013.01); *H04B 1/713* (2013.01); *H04R 1/1041* (2013.01); *H04R 1/1075* (2013.01); *H04R 3/12* (2013.01); *A63B 2071/063* (2013.01); *A63B 2071/0663* (2013.01); *A63B 2071/0666* (2013.01); *A63B 2102/18* (2015.10); *A63B 2225/50* (2013.01); *H04R 2201/023* (2013.01); *H04R 2420/07* (2013.01); *H04R 2460/13* (2013.01)

(58) Field of Classification Search
CPC .......... A63B 2102/18; A63B 2071/063; A63B 2071/0663; A63B 2071/0666; A63B 2225/50; G06F 3/165; H04R 1/1041; H04R 1/1075; H04R 3/12; H04R 2201/023; H04R 2420/07; H04R 2460/13
See application file for complete search history.

(56) References Cited

U.S. PATENT DOCUMENTS

| | | |
|---|---|---|
| 5,461,371 A | 10/1995 | Matsumoto et al. |
| 5,984,810 A | 11/1999 | Frye et al. |
| 6,285,757 B1 | 9/2001 | Carroll et al. |
| 6,301,367 B1 | 10/2001 | Boyden et al. |
| 6,652,284 B2 | 11/2003 | August et al. |
| 6,728,518 B1 | 4/2004 | Scrivens et al. |
| 7,110,552 B1 | 9/2006 | Saliterman |
| 8,126,143 B2 | 2/2012 | Daniel et al. |
| 8,156,571 B2 | 4/2012 | Barzilla |
| 8,201,274 B2 | 6/2012 | Ellis |
| 8,279,051 B2 | 10/2012 | Khan |
| 8,666,075 B2 | 3/2014 | Daniel et al. |
| 8,793,321 B2 | 7/2014 | Williams |
| 8,964,980 B2 | 2/2015 | Daniel |
| 9,071,901 B2 | 6/2015 | Black |
| 9,129,541 B2 | 9/2015 | Weiler et al. |
| 9,485,573 B2 | 11/2016 | Black |
| 9,757,068 B2 | 9/2017 | Cantrell |
| 10,080,950 B2 | 9/2018 | Kelley |
| 10,532,266 B2 | 1/2020 | Genova |
| 10,951,747 B2 | 3/2021 | Black |
| 11,266,897 B1 | 3/2022 | Charalambides |
| 2001/0002928 A1 | 6/2001 | Cummins |
| 2002/0132211 A1 | 9/2002 | August et al. |
| 2005/0049080 A1 | 3/2005 | Hovington |
| 2005/0170870 A1 | 8/2005 | Goldenberg et al. |
| 2005/0212202 A1 | 9/2005 | Meyer |
| 2005/0228866 A1 | 10/2005 | Endler et al. |
| 2006/0025206 A1 | 2/2006 | Walker et al. |
| 2007/0290801 A1 | 12/2007 | Powell |
| 2008/0153557 A1 | 6/2008 | Matveev |
| 2008/0206723 A1 | 8/2008 | Hunter |
| 2008/0268913 A1 | 10/2008 | Heikkinen |
| 2010/0080390 A1 | 4/2010 | Daniel |
| 2010/0091995 A1* | 4/2010 | Chen ..................... H04L 9/0869 380/278 |
| 2011/0190048 A1 | 8/2011 | Walthour |
| 2011/0246579 A1 | 10/2011 | Williams |
| 2012/0122069 A1 | 5/2012 | Coleman |
| 2013/0052943 A1 | 2/2013 | Black |
| 2014/0064511 A1 | 3/2014 | Desai |
| 2014/0119554 A1 | 5/2014 | Chan |
| 2016/0158639 A1 | 6/2016 | Cantrell |
| 2016/0322078 A1 | 11/2016 | Bose et al. |
| 2017/0065872 A1 | 3/2017 | Kelley |
| 2017/0070797 A1* | 3/2017 | Spector ................. H04R 1/028 |
| 2017/0144024 A1 | 5/2017 | Warners et al. |
| 2017/0372564 A1 | 12/2017 | Amelio et al. |
| 2018/0043229 A1 | 2/2018 | Stemle |
| 2018/0234190 A1 | 8/2018 | Rauhala |
| 2018/0294893 A1 | 10/2018 | Pedersen et al. |
| 2019/0258452 A1 | 8/2019 | Yamada |
| 2019/0391254 A1 | 12/2019 | Asghar et al. |
| 2020/0188761 A1 | 6/2020 | Williams |
| 2021/0141414 A1* | 5/2021 | Verma ................ G07C 9/00571 |
| 2021/0225141 A1 | 7/2021 | Petrillo |
| 2022/0276826 A1 | 9/2022 | Hankins et al. |
| 2023/0009354 A1 | 1/2023 | DeCarlo |
| 2023/0196770 A1 | 6/2023 | Anton et al. |
| 2023/0410507 A1 | 12/2023 | Hall et al. |
| 2024/0220189 A1 | 7/2024 | Hankins et al. |

FOREIGN PATENT DOCUMENTS

| | | |
|---|---|---|
| JP | 2006229373 A | 8/2006 |
| JP | 2009159447 A | 7/2009 |
| WO | 2015196246 A1 | 12/2015 |
| WO | 2021113073 A1 | 6/2021 |

OTHER PUBLICATIONS

International Preliminary Report on Patentability issued Jun. 16, 2022 in corresponding PCT/US2020/060893.
"Inception" by ProMystic, product release 2018, see https://promystic.com and https://www.penguinmagic.com/p/13973.
International Search Report and Written Opinion issued Jun. 28, 2022 in PCT/US2021/065370.
Non-Final Office Action issued Nov. 16, 2023 in U.S. Appl. No. 17/562,626.
Notice of Allowance issued Dec. 14, 2023 in U.S. Appl. No. 17/562,626.
International Search Report and Written Opinion issued Jan. 25, 2023 in PCT/US2022/047163.
Non-Final Office Action issued May 31, 2024 in U.S. Appl. No. 18/606,378.
Non-Final Office Action issued Jun. 3, 2024 in U.S. Appl. No. 18/606,804.
https://gamedaysignals.com/, Aug. 17, 2018.

* cited by examiner

BASEBALL PITCH SELECTION COMMUNICATION SYSTEM

TECHNICAL FIELD

The present disclosure relates generally to a communication system for communicating a pitch selection to a baseball pitcher in a secure manner to prevent sign stealing.

BACKGROUND

In the game of baseball, pitchers will throw a variety of pitches. For example, different types of pitches include fastballs, which are thrown relatively straight, and as the name implies, are thrown at the highest velocity among the pitcher's repertoire of pitches. A curveball is generally thrown at a lower velocity with a high rate of sidespin, so that the ball approaches the batter with a more curving trajectory. A slider is between a fastball and a curve, as it is a faster pitch than a curveball, but less than that of a fastball, with a sharper break towards the end of the pitch. A changeup is the slowest of pitches. There are still other types of pitches, such as a knuckleball, a forkball, a splitter, etc. Pitchers will not be able to throw all these different types of pitches, but will be able to throw some subset of these pitches.

While it is very difficult to hit a baseball thrown by a major league pitcher in any event, it is much easier for a major league batter to hit a pitch if they know what type of pitch is coming, i.e., whether the pitch will be a fastball, curveball, slider, etc. The batter can time the pitch more effectively, as well as anticipate the trajectory of the pitch and alter his swing to match the incoming pitch. On the other hand, it is important for the catcher to know what pitch is coming, because it is very difficult to catch a major league pitch that is a different type than the one expected. In other words, if a catcher is expecting a curveball, and the pitcher unexpectedly throws a fastball, the speed of the fastball can surprise the catcher and cause him to miss the ball or even get injured.

Accordingly, since the early days of baseball, catchers have communicated with pitchers to select which pitch to throw. The catcher has usually signaled using the fingers of their throwing hand to indicate the pitch selection. Their fingers are normally held pointing downwardly between their legs when the catcher is in his crouch. This shields the opposing team from seeing the pitch signal. A pitch selection signal may be one finger for a fastball, two for a curve, etc. The pitcher is able to see the catcher's fingers and know which pitch to throw. Unfortunately, an opposing player standing on second base is able to see the signals as well. If the runner is able to decode the signal, he can send a visual signal to the batter to indicate what type of pitch is coming. To combat this from happening, a catcher will run through a series of pitch signals with his fingers in a code.

Although catchers use codes to try to prevent anyone from stealing the signals, the visual nature of the signals allows anyone able to see the signals to decode the finger signals. It is a time-honored tradition for players on second base to try to decode the signals, but in recent years, more advanced means have been rumored to have been employed to ascertain the pitch selection. There has been suspected sign stealing using video to provide a team employee the ability to view the catcher's finger signals and provide an audible or other signal to the batter to indicate the suspected pitch selection, such as by a whistle to indicate a fastball instead of a curve, for instance. As baseball is a tradition-minded sport, the use of video and cameras and communication with the dugout to indicate the other team's pitch selection is considered a form of cheating. Furthermore, as baseball games become longer and longer (the average game length has significantly increased over the years, threatening fan interest), the running through of multiple signals for each pitch in an effort to prevent or hinder decoding of the pitch selection adds quite a bit of time to each game, in the tens of minutes.

SUMMARY

There is a need for a secure communication system that allows a pitch type to be selected and communicated to a pitcher while keeping the other team from knowing which pitch type was selected.

This and other needs are met by embodiments of the present disclosure which provide a baseball pitch selection communication system comprising a pitch selection transmitter that includes a pitch selector actuatable to select one of n different pitch selections to be transmitted, a wireless transmitter that wirelessly transmits a pitch selection signal in accordance with the actuated pitch selection, and a receiver configured to receive the pitch selection signal and audibly indicate the selected pitch in accordance with the received pitch selection signal.

The earlier stated needs are also met by other embodiments of the present disclosure which provide a system for communicating pitch selections wirelessly from a wireless transmitter having a coded signal generator that generates coded signals in accordance with selected pitch types, and a receiver that decodes the received coded signals, selects an audio file based on the received coded signal and generates an audio signal based on the selected pitch type in accordance with the received coded signals, the audio signal being transduced by a bone conductor transducer.

The communication system of the present disclosure overcomes many of the concerns with prior methods for signaling a pitch type. By not using a visible signal, sign stealing can no longer be accomplished through the use of video to view the catcher's signs. Also, the down time in games when there is nothing happening on the field, which occurs when the catcher is using multiple signs to throw off potential sign stealing operations, will be eliminated. Further advantages will be realized as discussed in the detailed description.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, well-known structures and components are shown in block diagram form in order to avoid obscuring the concepts of the subject technology.

Figure 1:
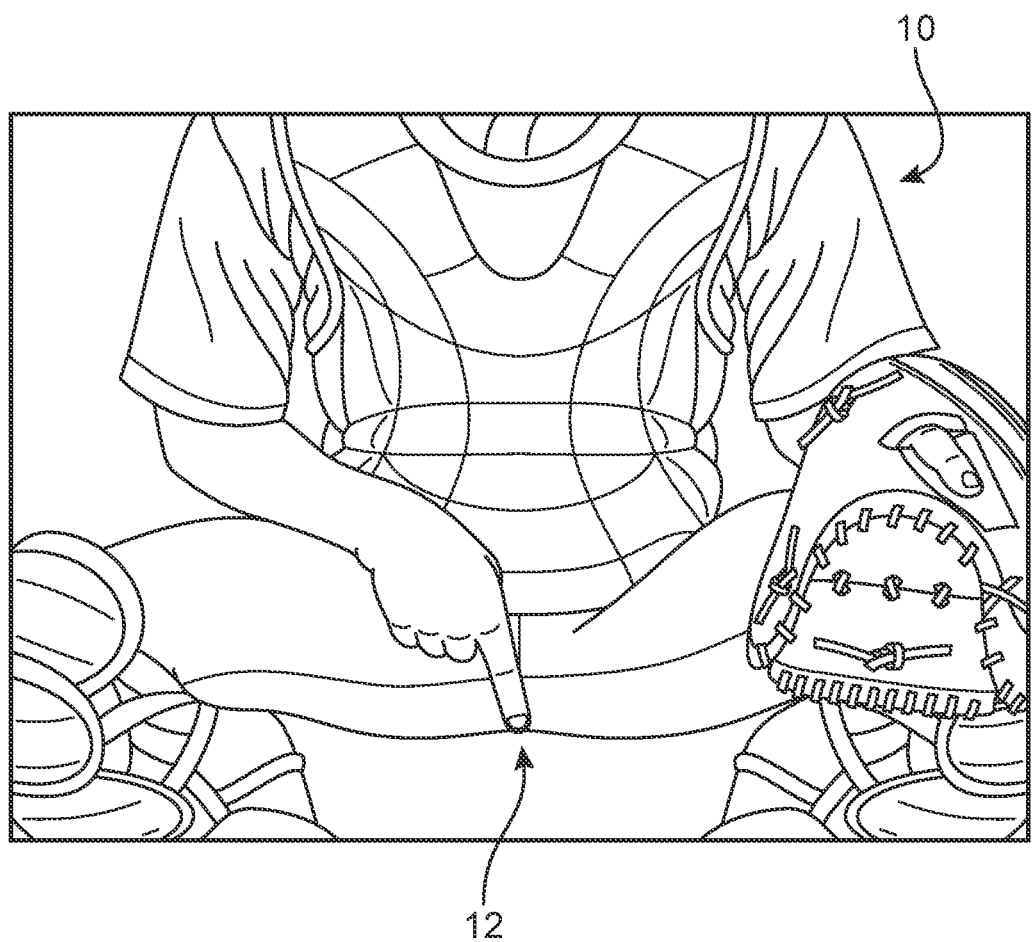
FIG. 1 is a rough depiction of a portion of a catcher providing a pitch signal using a finger, in accordance with prior methodologies.

FIG. 1 illustrates a pitcher's view of bottom half of a baseball catcher 10 while the catcher 10 is providing a pitch selection signal in accordance with the prior art. As can be recognized, the catcher 10 is in a squatting or crouched position, the front of the catcher 10 facing the pitcher. The catcher 10 will extend one or more fingers 12 (in this case, one finger) to indicate the pitch type that the catcher desires the pitcher to throw. For example, one finger may mean the pitch type is a fastball. The problem with this method, however, is that not only will a runner on second base be able to view this signal, but so can anyone with binoculars, a camera, etc., having a similar view of the catcher 10 as the pitcher. Anyone watching on television, or thousands of fans in the stadium, for example, will have such a view, and can steal the pitch type signals.

Figure 2:
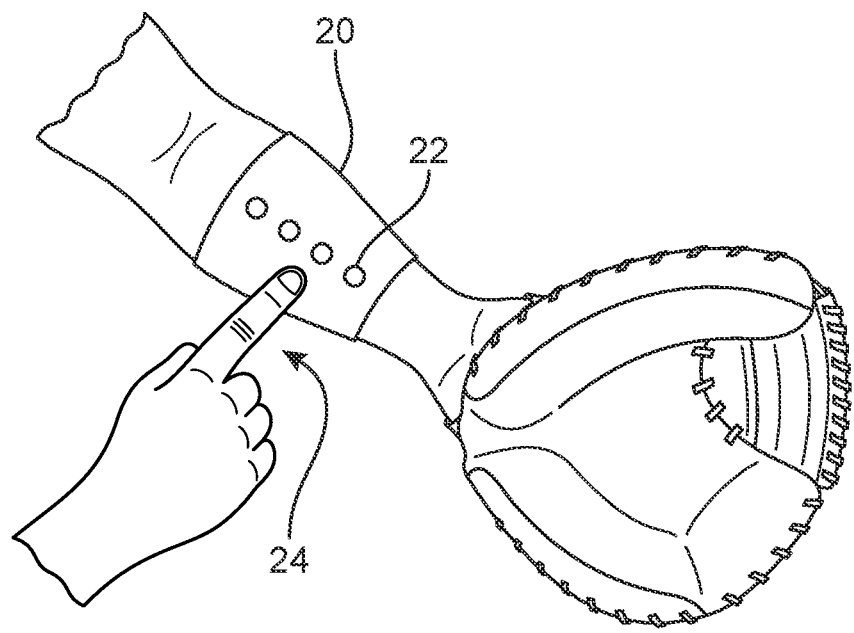
FIG. 2 is a view of a transmitter of the present disclosure.

A transmitter 20 constructed in accordance with embodiments of the present disclosure is depicted in FIG. 2. The transmitter 20 can be provided anywhere on the body of the catcher 10, or on the catcher's equipment, such as his glove, but is shown attached to the forearm of the glove arm of the catcher 10 in FIG. 2, as an example. As will be discussed later, transmitters 20 are not limited to provision to catchers 10, but can be provided to managers, pitching coaches, etc. The transmitter 20 illustrated in FIG. 2 has a number of buttons 22 that are actuatable by the catcher 10 to select and transmit a pitch type. The buttons 22 can be individually labeled with the pitch type, such as fastball, curve, etc. In FIG. 2, the buttons 22 are simply labeled A, B, C and D so that they can be easily reassigned to different pitches without confusing the catcher. Although four buttons are illustrated in this embodiment, fewer or greater numbers of buttons 22 can be provided on the transmitter 20. In certain embodiments, such as a transmitter used by a coach, the transmitter 20 also includes a display 29. Information, such as the selected pitcher, settings, and the pitch called, can be displayed on the display 29.

The throwing hand 24 of the catcher 10 can depress one of the buttons 22 on the transmitter 20 while the forearm of the gloved hand of the catcher 10 is facing the catcher's chest. This would prevent anyone but the catcher 10 from seeing which button 22 was depressed, and hence, which pitch type was selected. As will be explained in greater detail later, the depressing of a particular button 22 will cause a coded signal indicating a pitch type selection to be transmitted.

Figure 3:
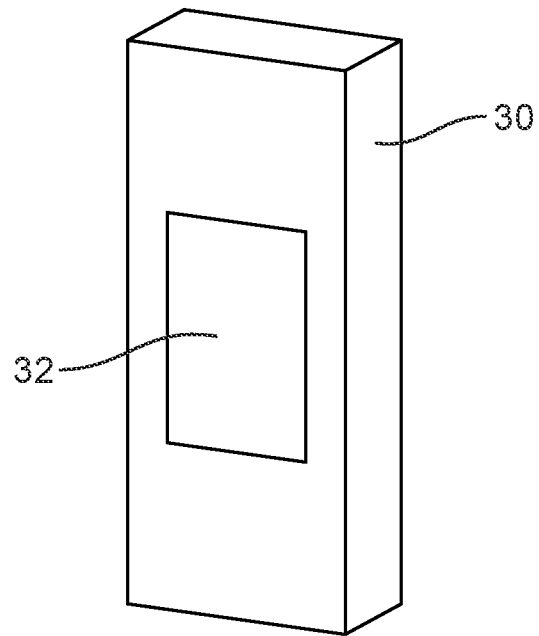
FIG. 3 is a perspective view of a receiver constructed in accordance with embodiments of the present disclosure.

An embodiment of a receiver 30 is depicted in FIG. 3. The receiver 30, according to certain embodiments, has a bone conductor 32 configured to transduce signals to produce a perceptible audible signal to a person. More details on the receiver will be provided later.

Figure 4A:
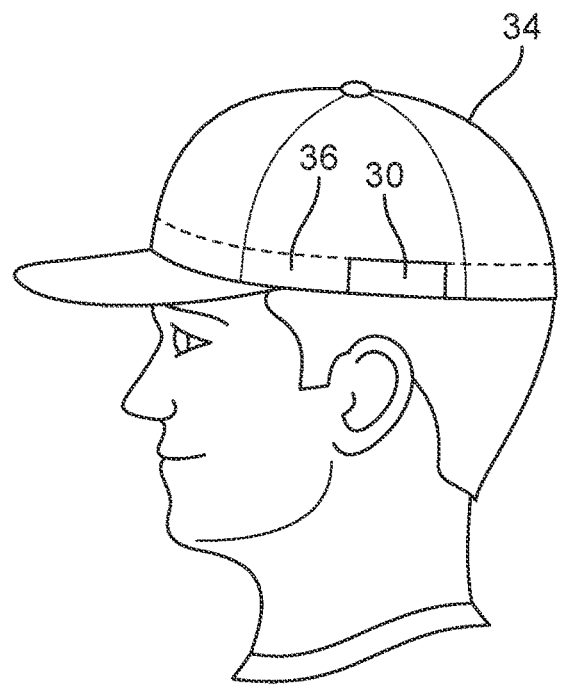
FIGS. 4a and 4b show the receiver of FIG. 3 installed in a baseball hat, in accordance with embodiments of the present disclosure.
Figure 4B:
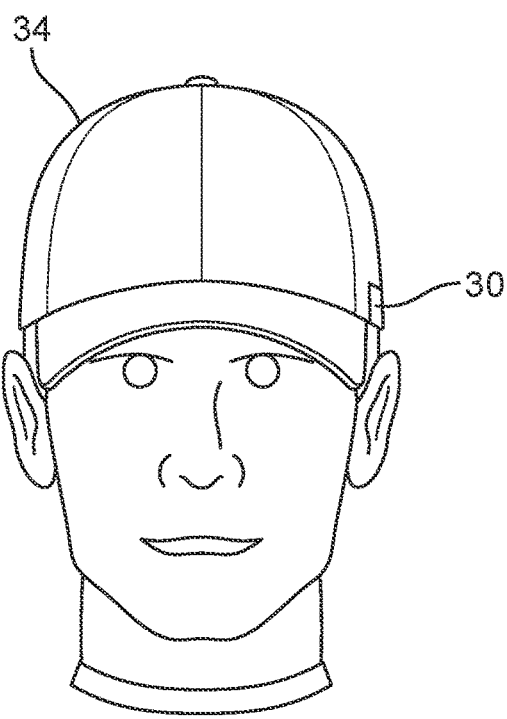

FIGS. 4a and 4b show the receiver 30 of FIG. 3 installed in a baseball hat 34 in an exemplary position. The position of the receiver 30 can be within a sweatband 36 that commonly runs around the bottom of a baseball cap. In certain embodiments, the receiver 30 is sized to fit substantially within the sweatband 36 and is held in place there, by clips (not shown), for example. The receiver 30 can be advantageously positioned on the side of the head, the back of the head, or the top. Positioning may depend on safety considerations, as well as audio reproduction considerations. An advantage of using bone conduction technology to reproduce the audio files is that typically only the wearer of the bone conductor receiver will be able to hear the audio produced (or transduced) by the bone conductor, even if the volume is turned up very high. Hence, there is little to no likelihood that another player, other than the player wearing the receiver 30, will be able to hear the information provided from the audio file and receiver 30.

Figure 5:
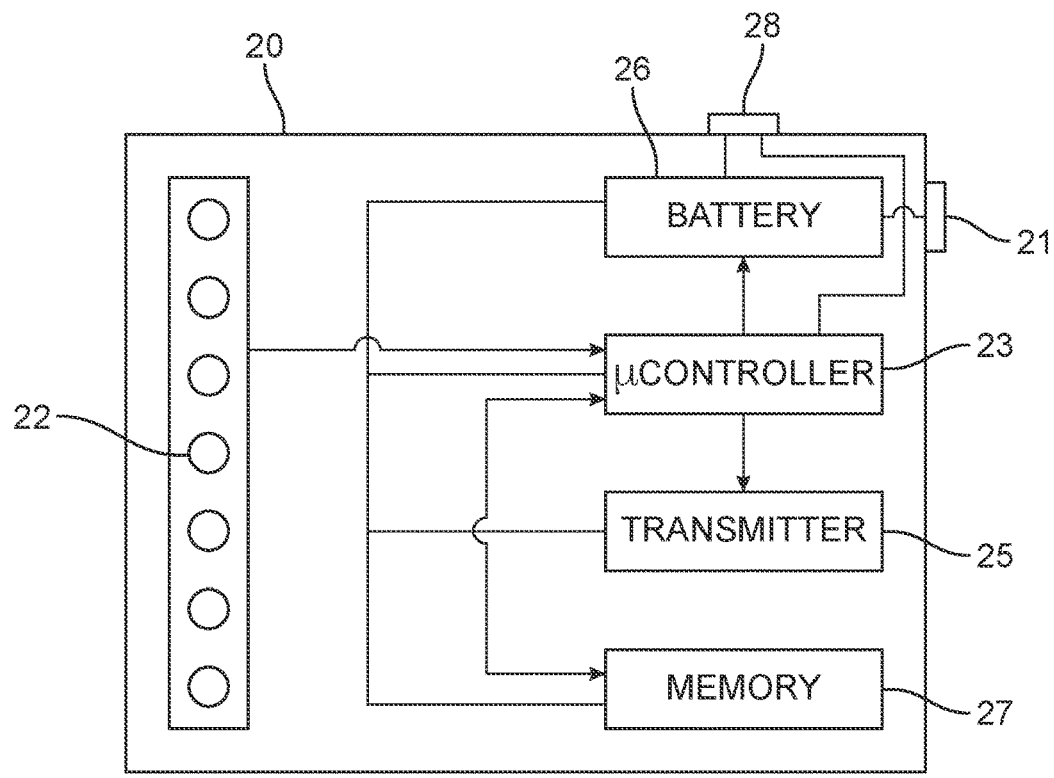
FIG. 5 is a block diagram of a transmitter constructed in accordance with embodiments of the present disclosure.

FIG. 5 shows a block diagram of an exemplary embodiment of a transmitter 20 constructed in accordance with the present disclosure. The transmitter 20 has a rechargeable battery 26 that acts as the power source for the components of the transmitter 20. The battery 26 can be recharged through a port 28, such as a micro USB port, or through wireless charging, or replaceable non-rechargeable batteries could be employed instead. The transmitter 20 is turned on via an externally actuatable power switch 21, which could be a slide switch or a push button switch, for example. A conventional microcontroller 23 is coupled to the battery 26, a wireless transmitter unit 25 and a memory 27, as well as the input buttons 22. The microcontroller 23 is also connected to the port 28 to allow programming and external communication. In operation, once the transmitter 20 is powered on via power switch 20, a catcher 10 (or manager or pitching coach) depresses one of the buttons 22. This causes the microcontroller 23 to discern the button 20 that has been depressed, which corresponds to a pitch type selection. The microcontroller 23 will either use its own internal memory, or the external memory 27 to generate a coded signal, which can simply be the code for a "1", "2", "3", etc. A long string of characters is not needed, as the receiver 30 will use this numerical code to reference the correct corresponding audio file. The coded signal is provided to the transmitter unit 25 that wirelessly transmits the coded signal via its antenna.

Figure 6:
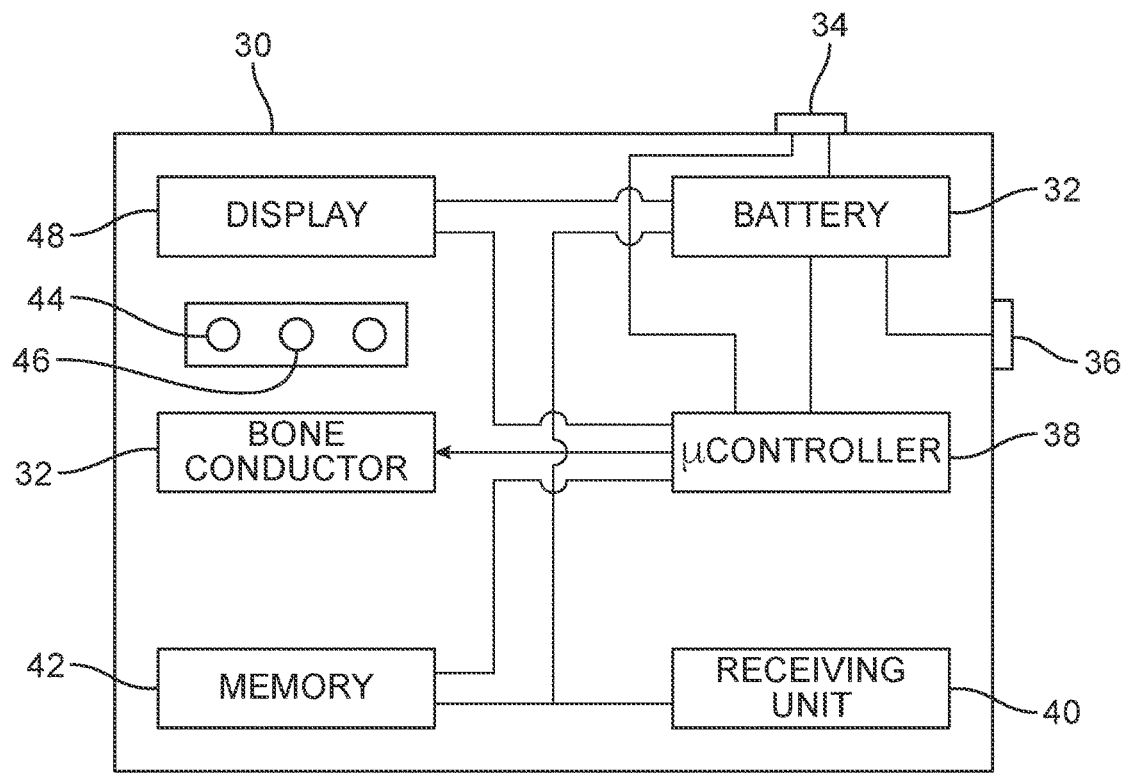
FIG. 6 is a block diagram of a receiver constructed in accordance with embodiments of the present disclosure.

FIG. 6 shows a block diagram of an exemplary embodiment of a receiver 30 constructed in accordance with the present disclosure. The receiver 30 has a rechargeable battery 32, although other types of batteries can be used. The battery 32 can be recharged through a port 28, as such as a micro USB port 28, which also can be used as a conduit to program the microcontroller 38 and to store audio files within the memory 42. A display 48, such an LED display, can be provided in certain embodiments, to enable a visual interaction with a user, such as when programming the receiver 30, or selecting a subset of audio files to use. For example, audio files 80a-80d are used for pitcher Smith, while audio files 80e-80h are used for pitcher Jones. These different subsets can be selected through control buttons 46. A conventional wireless signal receiving unit 40 is provided and controlled by the microcontroller 38. The receiving unit 40 receives the coded signals from the transmitter 20. The receiving unit 40 can be considered to include an antenna 41, which can take different forms. For example, the antenna 41 can be a conventional chip antenna, as is commonly used in other applications. In other embodiments, the antenna 41 may be a longer antenna and extend along the body of the receiver 30. In operation, the microcontroller 38 decodes a received coded signal and causes the bone conductor 32 or other sound reproducer to play the particular audio file that corresponds to the pitch type selected, as discussed below.

Figure 7:
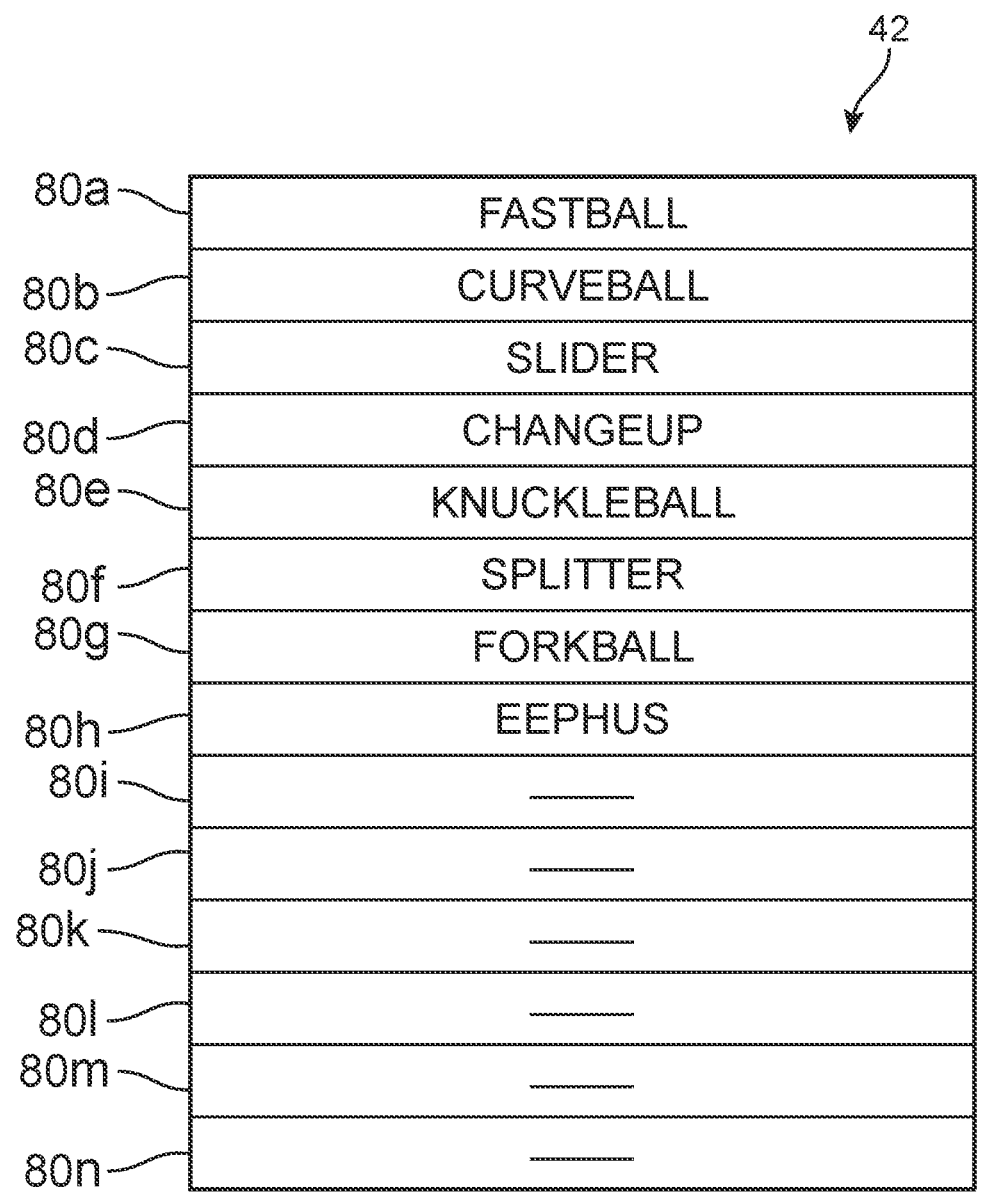
FIG. 7 is a schematic depiction of audio files stored in memory locations in accordance with embodiments of the present disclosure.

In the exemplary embodiments, the receiver 30 has a plurality of audio files 80a-80n that are stored in memory 42. These audio files are played by the receiver in accordance with the received coded signal. A schematic depiction of an audio file listing stored in the receiver memory 52 is depicted in FIG. 7. In operation, the receiver 30 receives a coded pitch selection signal, such as a "1", reflecting the "1" button 22 depressed by the catcher 10 on his transmitter 20. This particular signal can mean "fastball". When the receiver 30 receives the coded signal, the microcontroller 38 of the receiver 30 decodes the signal and determines that the signal is a "1" signal, and will reproduce the audio file from file location "1". In this example, the audio file 80a at the "1" location corresponds to "fastball", so the word "fastball" is audibly reproduced by the receiver 30 through the bone conductor 32.

The use of coded signals that are decoded and reproduced according to stored audio files has a number of significant advantages over other communication systems that are employed in sports. For example, a radio receiver, such as used in football helmets to call in plays, employs someone speaking into a microphone for transmission of the voice directly to the quarterback. This is impractical in baseball, as the catcher cannot speak the name of the pitch without revealing the pitch to the batter. Rather, in accordance with the present disclosure, the simple pressing of a single button will convey the pitch selection to the pitcher. Furthermore, security is assured more easily through the coding of the pitch selection than can be achieved through wireless voice communications.

Security of communication is a major concern for sports teams. In certain embodiments, a radio communication protocol is employed that provides secure messaging between all parts of the system, is protected from possible radio noise and interference with other team's equipment or tampering. Each team will use its own unique key shared across the whole team system for encryption and identification purposes. The transmitter 20 and the receiver 30 communicate through a radio communication protocol that may include, but is not limited to, one of the following technologies: addressed and broadcast messaging; delivery confirmation; data integrity check; data encryption using one of the standard algorithms (RC4, AES, etc.) or its modification; a hopping code; Hopping Frequency Spread Spectrum (HFSS); radio channel occupancy monitoring; backup communication channel or other such technologies well-known to those of skill in the art.

Storage of the audio files in the receivers 30 allows for a number of advantages of the present communication system. As is well-known, baseball is an international sport such that players in the major leagues come from many different countries and speak many different languages. Translators have been used at the pitching mound for conferences. However, employing audio files as in the present invention, permits the audio files to be in a number of different languages. For example, a Japanese pitcher's audio files stored in his receiver may be in Japanese, so when his Spanish-speaking catcher presses "1" for a fastball, the receiver 30 will play the audio file "1" that has stored the word "fastball" in the Japanese language. A Spanish speaking pitcher will have his audio files in Spanish, an English speaker in English, and so on.

Wearing a receiver 30 is not limited to pitchers. It is desirable for the catcher 10 to have a receiver 30 installed in his helmet so that he will confirm the pitch type that he transmitted to the pitcher. Otherwise, he may have accidentally pressed "1" for fastball, thinking that he pressed "2" for curveball, and without the audible feedback provided by an installed receiver, will be unprepared for a fastball and may miss the pitch or be injured. Further, other defenders in the field may have receivers 30 installed in their hats. Traditionally, by knowing which pitch is about to be thrown, fielders will shift their positions slightly to better anticipate where the batter is likely to hit the ball.

Analogously, transmitters 20 are not limited to catchers 10. They can also be used by people in the dugout, such as the manager or pitching coach to call the pitches. This may be especially helpful when an inexperienced catcher 10 is playing, or an unfamiliar batter is at the plate and the manager wants specific pitches to be called. The buttons the manager or pitching coach presses can play the same or different audio files than the ones the catcher 10 uses. For example, the catcher may press one of four buttons, corresponding to four different pitch audio files 80 in the receiver 30. The manager or pitching coach may have four or more additional buttons to use, that will correspond to additional audio files (e.g., audio files 5-9) in the pitcher's receiver 30. In addition to the names of pitches, the audio files 80 could also be used to produce audible instructions or reminders to the pitcher, such as "keep your front shoulder in as you deliver the pitch". If major league rules would prevent such use of the system, the system can be easily locked to prevent this and just have pitches stored and reproducible in the receivers 30. Additionally, buttons could be used to tell the pitcher to throw a pitchout, or to throw over to first base instead of throw a pitch.

The receiver 30 has a number of audio files 80a-80n, as depicted schematically in FIG. 7. Each audio file 80 can be recorded in a language that is specific to the person listening to the audio file 80. For example, if the pitcher is Korean, the receiver 30 for that pitcher will contain audio files recorded in Korean. If Japanese, they will be recorded in Japanese, and so on. It is also, possible, of course, to provide audio files 80 in which some of the audio files are in one language, and others are in a different language.

The set of audio files 80a-80n can also be recorded to correspond to the different pitch repertoires that individual pitchers possess. For example, pitcher Jones may throw a fastball, curve, slider and changeup, while pitcher Smith may throw a fastball, knuckleball, splitter and changeup. The audio files stored in the receiver 30 worn by pitcher Jones will have the audio file corresponding to the second pitch selection signal sent by a transmitter 20 be recorded to say curveball, for example, when the second button 22 on the transmitter 20 is depressed by the catcher 10. However, when the same second button 22 is depressed when pitcher Smith is on the mound, the audio file corresponding to the second pitch selection signal will have the audio file recorded to say knuckleball. Hence, the same transmitter 20 can be used to send the same encoded signals. These encoded signals merely indicate which audio file in a receiver 30 will be played. Versatility is provided by the different audio recordings in the same audio slots from receiver 30 to receiver 30. Making audio recordings is readily accomplished through a computer (not shown) or other means to create audio files that are stored in the receiver 30 in audio slots that correspond to the different received pitch type signals from the transmitter 20. The receiver 30 can be connected to the computer and recorded audio files in a folder can simply be dragged into a file or folder of the receiver 30.

An advantageous feature of the receiver 30 provided in certain embodiments is a repeat button 44 (FIG. 6) that will repeat the playing of the audio file 80-80n, in the event that the pitcher, in the heat of competition, desires a reminder of the pitch type that was called. Also, for player comfort, volume control is also provided at the receiver 30 in certain embodiments.

In order for the catcher 10 not to have to memorize which audio files for each of the individual pitchers correspond to which buttons 22 on the transmitter 10, an overlay (not shown) can be provided for each pitcher, that labels each of the buttons 22 with the corresponding pitch types in each pitcher's repertoire, and hence, that pitcher's audio files stored in the pitcher's receiver 30.

Figure 8A:
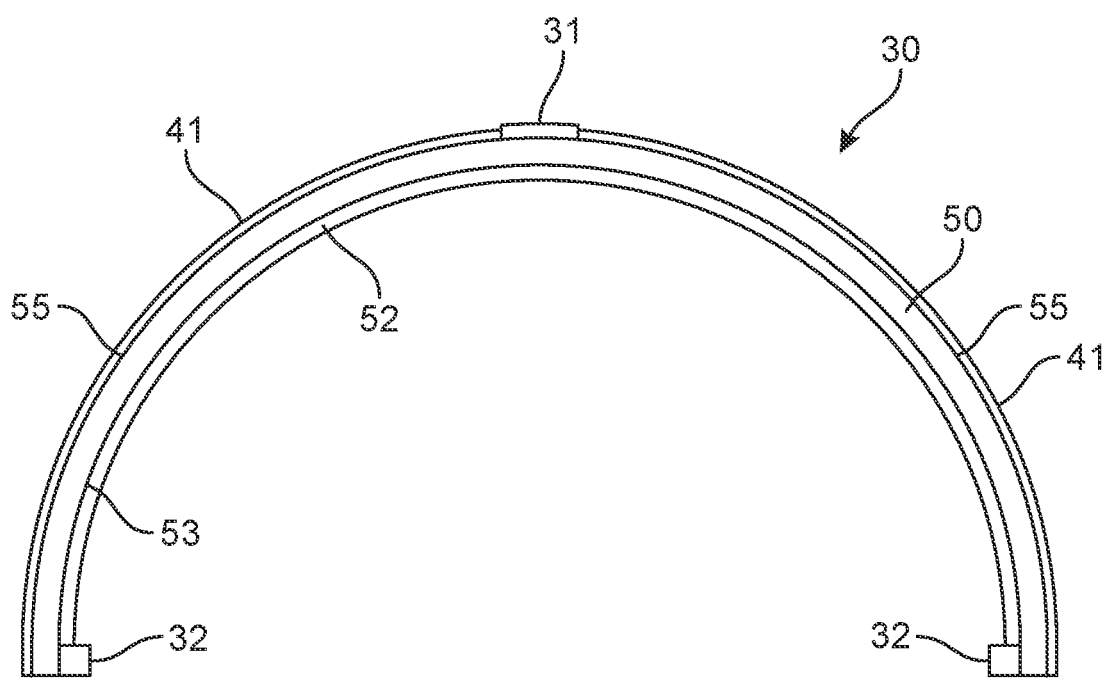
FIGS. 8a and 8b depict another embodiment of the receiver in isolated perspective view and in phantom side view installed in a hat, respectively.
Figure 8B:
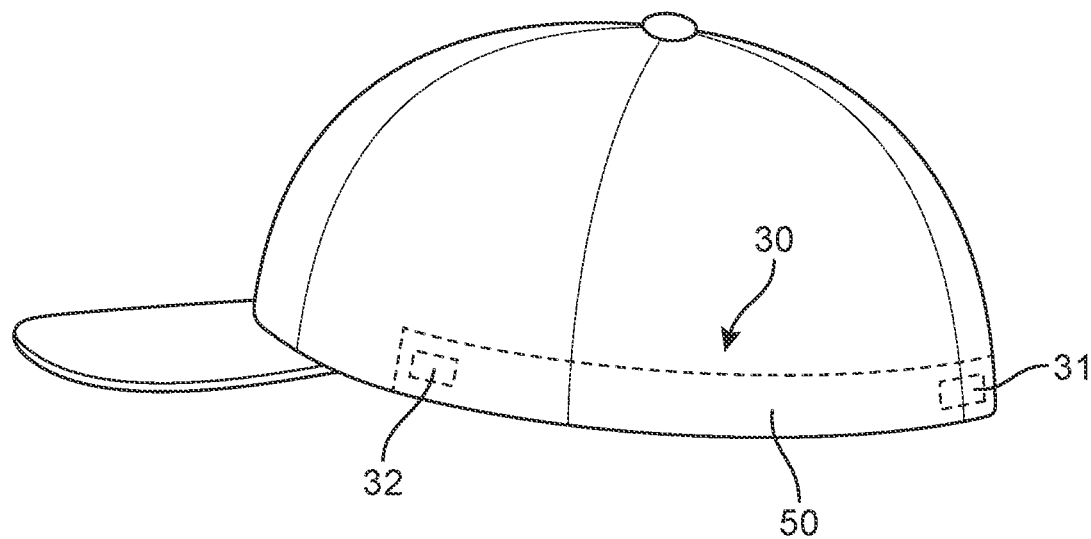

FIGS. 8a and 8b depict another embodiment of a receiver 30 constructed in accordance with the present disclosure, in perspective isolated view and in phantom view installed in a hat, respectively. The receiver 30 in FIG. 8a is seen to be shaped as a band 50 that is designed to act as a substrate and extend from above one ear, around the back of the head, to above the other ear, in an approximately semi-circular or semi-oval shape similar to the shape of the rim of the back half of a baseball cap. In certain embodiments, the band 50 is made of a skin-safe rubber that will not irritate the skin of most people. The band 50 is sized and shaped to fit within the band of a baseball cap, as seen in FIG. 8b, and gently conform to the skull of the wearer to provide and comfortable and secure fit. At the same time, the band 50 assures that the multiple bone conductors 32 are properly positioned on the wearer's skull such that good conduction of the audio signal is provided to the wearer. Multiple bone conductors 32 can increase the volume of the audio perceived by the wearer.

The band 50 acts as a substrate to carry an electronics board 31 that carries at least some of the electronic components of the receiver 30, for example, the microcontroller 38, the receiving unit 40 and the memory 42. The band 50 is configured to extend around the back of and along both lateral sides of a baseball style cap.

A longer antenna 41 may be used in this embodiment, as described earlier. This antenna 41 can extend over most of the length of the band 50, and may provide increased range of reception. Depending on a number of factors, transmission range between the transmitter 20 and the receiver 30 can be well over one hundred and fifty feet. Safety considerations are also a factor in sports equipment, and in certain embodiments, a protective material is provided that further increases the safety of the cap to wearers. Although the receiver 30 should provide some protection by dissipating some energy if a ball should strike the band 50 during play, additional protective material 52 may be provided to further soften the impact a player receives to the head. For example, a silicon rubber layer 52 can be provided on the interior surface 53 and/or the exterior surface 55 of the band 50. Cut-outs (not shown) can be provided in the layer 52 to allow the bone conductors 32 to contact the head directly.

The communication system described in the present disclosure thus provides secure communication of pitch types, without using visual signaling that can be intercepted through video, binoculars and other methods and then decoded. This has the beneficial effect of speeding up baseball games, with the games more concentrated on the action rather than waiting for a catcher to run through a series of signs, which otherwise happens literally hundreds of times a game. A simple push of a button provides the pitcher, catcher and any fielder with instant knowledge of the pitch type, in that player's native language.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure us explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principled defined herein may be applied to other aspects. Thus, the claims are not intended to be limited to the aspects shown herein, but are to accorded the full scope consistent with the language of the claims, wherein reference to an element in the singular is not intended to mean "one and only one: unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any are used for convenience only and do not limit the subject disclosure.

The invention claimed is:

1. A system for communicating pitch selections wirelessly, the system comprising:
    a transmitter having a signal generator that generates a coded signal in accordance with a selected pitch type, and a wireless transmitter coupled to the signal generator and configured to transmit a coded wireless signal signifying the selected pitch type in accordance with the coded signal;
    a wireless receiver that decodes the received coded wireless signal, selects a stored audio file corresponding to the selected pitch type based on the received coded signal and generates an audio signal from the stored audio file; and
    at least one bone conductor that transduces the audio signal into a human-perceptible signal.

2. The system of claim 1, wherein the wireless transmitter is a spread spectrum wireless transmitter that transmits the coded wireless signal as a spread spectrum signal.

3. The system of claim 2, wherein the spread spectrum signal is transmitted using a frequency-hopping spread spectrum transmission protocol.

4. The system of claim 3, wherein the spread spectrum signal is transmitted using a direct-sequence spread spectrum transmission protocol.

5. The system of claim 2, wherein the transmitter includes a plurality of human-actuatable elements that are actuated by a user to select the selected pitch type.

6. The system of claim 5, wherein the plurality of human-actuatable elements are individual buttons.

7. The system of claim 6, wherein the transmitter is a wrist-worn device.

8. The system of claim 5, wherein the transmitter is a tablet device.

9. The system of claim 1, wherein the wireless receiver substantially fits within a sweatband of a baseball style cap.

10. The system of claim 9, wherein the wireless receiver has a single bone conductor, the wireless receiver sized to fit within the sweatband on only one lateral side of the baseball style cap.

11. The system of claim 9, wherein the wireless receiver has multiple bone conductors, the wireless receiver sized to fit within the sweatband around a back of and along both lateral sides of the baseball style cap.

12. The system of claim 11, wherein the wireless receiver has an approximately semi-circular substrate that fits within the sweatband, and an electronics board on which electronic components of the wireless receiver are mounted to the substrate, wherein the multiple bone conductors are mounted on the substrate and coupled to the electronic components of the wireless receiver.

13. The system of claim 12, wherein the electronic components of the wireless receiver include a battery, a microcontroller coupled to the battery, a receiving unit coupled to the microcontroller, and a memory coupled to the microcontroller.

14. The system of claim 13, wherein the wireless receiver includes an antenna coupled to the receiving unit and extending along a periphery of the substrate.

15. A system for communicating a selected pitch type to a person wearing a baseball hat, comprising:
a transmitter having a signal generator that generates a coded signal in accordance with a selected pitch type, and a wireless transmitter coupled to the signal generator and configured to transmit a coded wireless signal signifying the selected pitch type in accordance with the coded signal;
a hat with a wireless receiver that decodes the received coded wireless signal, selects a stored audio file corresponding to the selected pitch type based on the received coded signal and generates an audio signal from the stored audio file; and
at least one bone conductor that transduces the audio signal into a human-perceptible signal.

* * * * *